(12) United States Patent
Govindara et al.

(10) Patent No.: US 9,767,346 B2
(45) Date of Patent: Sep. 19, 2017

(54) DETECTING AN ATTENTIVE USER FOR PROVIDING PERSONALIZED CONTENT ON A DISPLAY

(71) Applicants: HEWLETT-PACKARD DEVELOPMENT COMPANY, L.P., Houston, TX (US); Anand Govindaraj, Karnataka (IN); Prasenjit Dey, Karnataka (IN)

(72) Inventors: Anand Govindara, Bangalore (IN); Prasenjit Dey, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 14 days.

(21) Appl. No.: 14/787,049

(22) PCT Filed: Apr. 26, 2013

(86) PCT No.: PCT/IN2013/000282
§ 371 (c)(1),
(2) Date: Oct. 26, 2015

(87) PCT Pub. No.: WO2014/174523
PCT Pub. Date: Oct. 30, 2014

(65) Prior Publication Data
US 2016/0110585 A1    Apr. 21, 2016

(51) Int. Cl.
*G06K 9/00* (2006.01)
*G06Q 30/02* (2012.01)
*G09F 27/00* (2006.01)
*G06F 17/30* (2006.01)
*H04N 7/18* (2006.01)

(52) U.S. Cl.
CPC ..... *G06K 9/00221* (2013.01); *G06F 17/30256* (2013.01); *G06Q 30/02* (2013.01); *G09F 27/005* (2013.01); *H04N 7/185* (2013.01); *G09F 2027/001* (2013.01)

(58) Field of Classification Search
None
See application file for complete search history.

(56) References Cited

U.S. PATENT DOCUMENTS

| 6,256,046 B1 | 7/2001 | Waters et al. | |
| 8,660,895 B1 * | 2/2014 | Saurabh | G06Q 30/0204 705/14.42 |

(Continued)

FOREIGN PATENT DOCUMENTS

| CN | 102375542 | 3/2012 |
| CN | 102880388 | 1/2013 |

(Continued)

OTHER PUBLICATIONS

PCT Search Report and Written Opinion—Application No. PCT/CN2013/000282 dated Feb. 6, 2014—11 pages.

*Primary Examiner* — Hadi Akhavannik
(74) *Attorney, Agent, or Firm* — HP Patent Department

(57) ABSTRACT

Provided is a method of detecting an attentive user to provide personalized content on a display. People proximate to a display are identified. Upon such identification, a user attentive to the display is detected amongst the people proximate to the display. Identity of the attentive user is determined and personalized content is displayed based on the identity of the attentive user.

15 Claims, 2 Drawing Sheets

(56) References Cited

U.S. PATENT DOCUMENTS

| | | | | |
|---|---|---|---|---|
| 8,700,451 | B2* | 4/2014 | Jayakody | G06Q 30/02 |
| | | | | 705/14.1 |
| 8,965,170 | B1* | 2/2015 | Benea | H04N 21/4223 |
| | | | | 386/224 |
| 9,195,320 | B1* | 11/2015 | Lee | G06F 3/017 |
| 2004/0037469 | A1 | 2/2004 | Werner et al. | |
| 2007/0024580 | A1* | 2/2007 | Sands | G06F 3/011 |
| | | | | 345/156 |
| 2008/0120182 | A1* | 5/2008 | Arnold | G06Q 30/0225 |
| | | | | 705/14.26 |
| 2008/0147488 | A1* | 6/2008 | Tunick | G06Q 30/02 |
| | | | | 705/7.29 |
| 2008/0222199 | A1* | 9/2008 | Tiu | G06F 17/3089 |
| 2008/0248815 | A1* | 10/2008 | Busch | H04W 4/02 |
| | | | | 455/456.5 |
| 2011/0161998 | A1* | 6/2011 | Alberth | H04N 7/18 |
| | | | | 725/10 |
| 2011/0243449 | A1 | 10/2011 | Hannuksela et al. | |
| 2012/0321143 | A1 | 12/2012 | Krupka et al. | |
| 2013/0046594 | A1* | 2/2013 | Davidson | G06Q 30/02 |
| | | | | 705/14.4 |
| 2013/0046637 | A1 | 2/2013 | Slutsky et al. | |
| 2013/0205314 | A1* | 8/2013 | Ramaswamy | H04N 21/44213 |
| | | | | 725/14 |

FOREIGN PATENT DOCUMENTS

| | | |
|---|---|---|
| CN | 102982753 | 3/2013 |
| WO | WO-2006060889 | 6/2006 |

\* cited by examiner

DETECTING AN ATTENTIVE USER FOR PROVIDING PERSONALIZED CONTENT ON A DISPLAY

BACKGROUND

It is common to find display devices at public places providing a variety of information to users. For instance, shopping malls or convenience stores typically provide information related to facilities and promotional schemes offered by them in order to attract more customers. Public utility places, such as airports, railways stations and bus stands also use display devices to provide information related to travel routes, timings and services. The content presented on such displays is generally meant for public at large and is not directed towards any particular user.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

As mentioned earlier, usage of display devices for providing information to public has increasingly become commonplace. These display devices are used to provide a variety of content, such as travel information, stock prices, advertisement, promotional schemes, etc. thereby serving as useful tools for a content provider to reach out to his audience. However, typically, information or content shared on such display devices is not meant for a specific individual or user; it is generally meant for a universal audience or public at large.

Proposed is a solution that detects an attentive user or a user actively engaged with a display in order to provide a personalized content on the display. In an example, an attentive user(s) is/are detected amongst people present in proximity of a display (for example, at a public place like a railway station) to provide personalized content to the attentive user(s) on the display. Proposed solution could be used, for example, in places like airports and malls where large digital signage or public kiosks installed therein have a unique challenge of identifying specific actively engaged user of the system to provide personalized experience.

Figure 1:
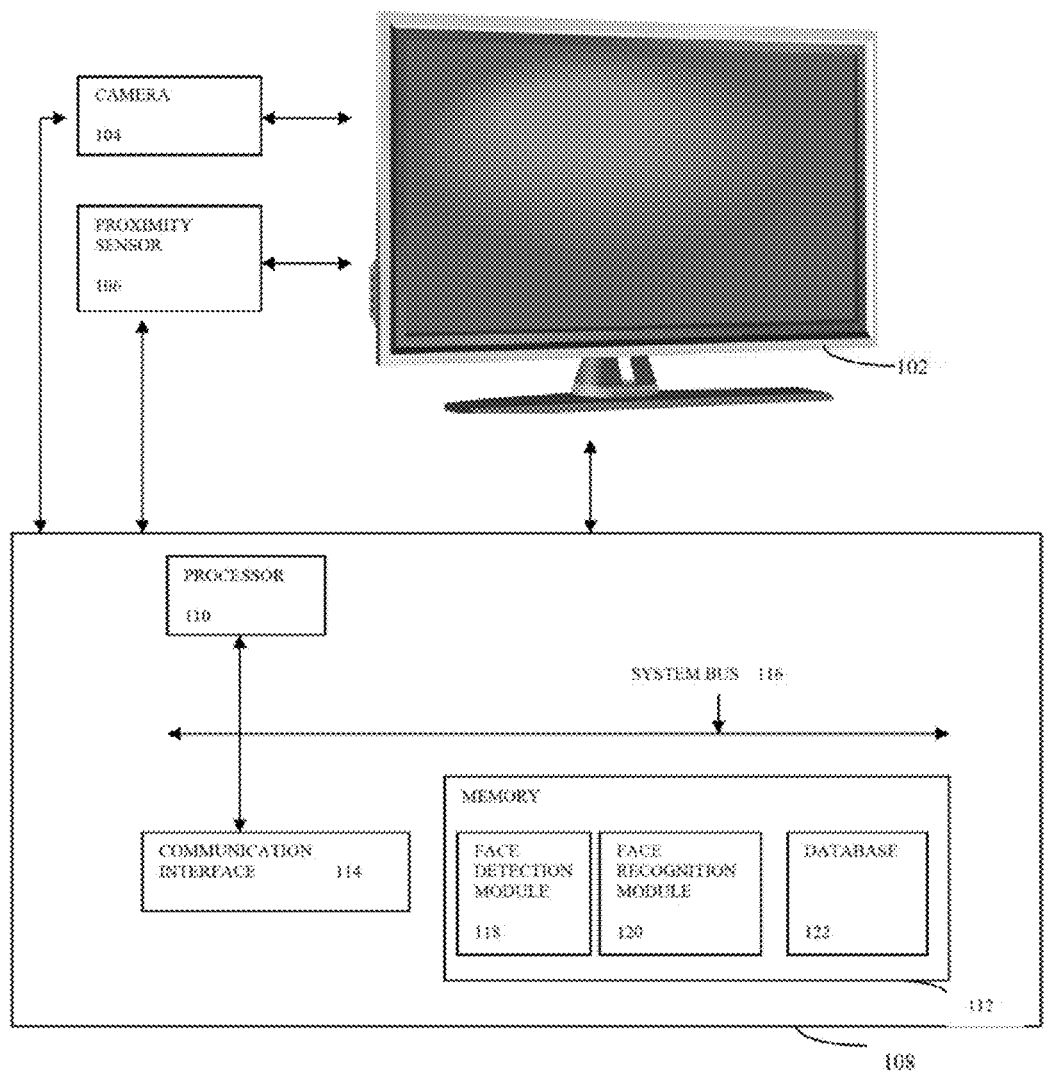
FIG. 1 is a block diagram of a system to detect an attentive user for providing personalized content on a display, according to an example.

FIG. 1 is a block diagram of a system to detect an attentive user for providing personalized content on a display, according to an example. System 100 includes display device 102, camera 104, proximity sensor 106 and computing device 108. Components of system 100 i.e. display device 102, camera 104, proximity sensor 106, and computing device 108 could be operationally coupled to each other.

Display device 102 may include a liquid crystal display (LCD), a light-emitting diode (LED) display, an Organic Light Emitting Diode (OLED), a Plasma Display Panel (PDP), a Laser Phosphor Display (LPD), a television, a computer monitor, and the like. Display device 102 may be a dumb display device or an intelligent display device. In an example, display device displays personalized content based on the identity of an attentive user.

Camera 104 may include a still camera, a digital camera, a web camera, a video camera, and the like. In an example, camera 104 along with face detection module 118 is capable of detecting a user attentive to display device 102 amongst people identified as proximate to display device 102.

Proximity sensor 106 is a sensor which is able to detect the presence of nearby objects without any physical contact. Proximity sensor 106 may be of various types. For instance, proximity sensor 106 may be a capacitive sensor, an inductive sensor, an infrared sensor, a magnetic sensor, an electromagnetic sensor, etc. Some non-limiting types of proximity sensor 106 include a Near Field Communication (NFC) based sensor, a Radio-frequency Identification (RFID) based sensor, etc. In an example, proximate sensor 106 identifies people proximate to display device 102.

Computing device 108 may include a processor 110, a memory 112, a communication interface 114. The components of computing device 108 may be coupled together through a system bus 116. Processor 110 may include any type of processor, microprocessor, or processing logic that interprets and executes instructions. Memory 112 may include a random access memory (RAM) or another type of dynamic storage device that may store information and instructions non-transitorily for execution by processor.

In an implementation, memory 112 includes face detection module 118, face recognition module 120 and database 122. Face detection module 118 (machine executable instructions) detect a user attentive to the display amongst the people proximate to the display. Face detection module 118 detects faces of individuals whose frontal faces are attentive to the display device (since, in an example, the camera that captures the faces is mounted frontal on the display) and the location of such individuals relative to the display device. In an example, face detection module 118 is present within camera 104. Face recognition module (machine executable instructions) 120 determines the identity of an individual(s) who is/are attentive to display device 102. In an implementation, face recognition module 120 determines the identity of the individual(s) who is/are attentive to the display device from a pre-existing set of user profiles or identities stored in database 122 which may be present on a computing device coupled to the display. In an example, face recognition module 120 is present within camera 104. Database 122 stores a set of user profiles or identities. In an implementation, database 122 is a repository comprising passport profiles of individuals. In another implementation, database 122 is a repository of an online social network.

Communication interface 114 may include any transceiver-like mechanism that enables computing device 108 to communicate with other devices and/or systems via a communication link. Communication interface 114 may be a software program, a hard ware, a firmware, or any combination thereof. Communication interface 114 may use a variety of communication technologies to enable communication between computer server and another computing device. To provide a few non-limiting examples, communication interface may be an Ethernet card, a modem, an integrated services digital network ("ISDN") card, a network port (such as a serial port, a USB port, etc.) etc.

Figure 2:
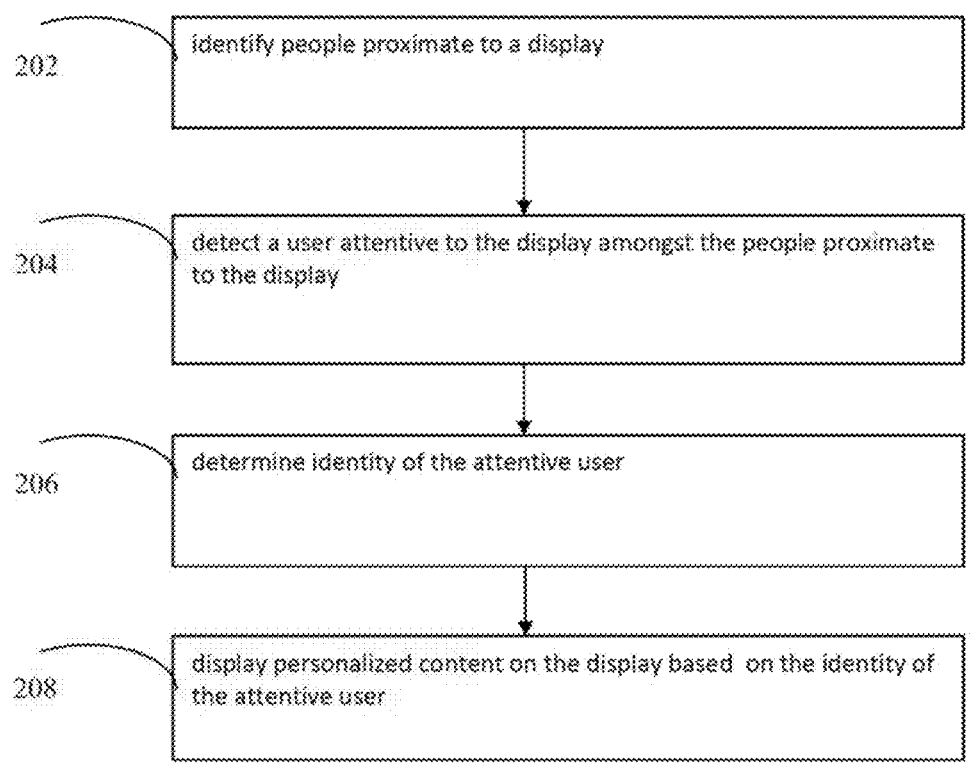
FIG. 2 illustrates a method of detecting an attentive user for providing personalized content on a display, according to an example.

It would be appreciated that the system components depicted in FIG. 2 are for the purpose of illustration only and the actual components may vary depending on the system and architecture deployed for implementation of the present solution.

FIG. 2 illustrates a method of detecting an attentive user for providing personalized content on a display, according to an example. At block 202, people proximate to a display device are identified using a proximity sensor(s). Proximity sensor is operationally coupled to the display device, and may be a removable or non-removable module with respect to the display device. The display device could be located at a public place. For example, the display device could be located at a shopping mall, railway station, an airport, bus terminal, and the like. In another instance, the display device may be placed at a private facility or a facility with a restricted or limited entry. For example, the display device may be located at an office facility, a private medical facility, a private recreational facility, and the like.

The term "proximate" in the present context is determined by the type of proximity sensor used to identify people or individuals close to a display device. In other words, which individuals could be considered as proximate to a display device would depend upon the proximity sensor deployed to identify people. To provide an example, if Radio-frequency Identification (RFID) technology is used to identify people then individuals considered "proximate" to a display device would be defined by the communication range of RFID technology, which typically is up to a few meters. In another example, if Near Field Communication (NFC) technology is used for identifying people close to a display then "proximity" of individuals to a display is determined by the communication scale of NFC, which is generally up to a few centimeters. Thus, the "proximity" of an individual to a display device depends on the type of proximate sensor used. The aforementioned examples of proximity sensors are for the purpose of illustration only, and other types of proximate sensors could be used as well.

The "identification" of people proximate to a display device depends on the type of proximity sensor(s). In other words, how a proximate individual is identified would depend on the type of proximity sensor used for identification. For example, if Radio-frequency Identification (RFID) technology is used to identify people then, in an instance, tags, or labels attached to an object carried by an individual may be used to identify the individual. In this case, a reader or interrogator device may be used to read the aforesaid tag or label associated with an individual. To provide another example, if Near Field Communication (NFC) technology is used for identifying people proximate to a display then, in an instance, an NFC tag or sticker carried by an individual may be used to identify the individual. In such case, an NFC-enabled device or reader may be used to read the aforesaid tag or sticker associated with an individual. In an implementation, the aforementioned types of communication tags, labels, stickers, or the like, are present external or internal to a personal device carried by an individual. Some non-limiting examples of a personal device may include a mobile phone, a tablet, a laptop, and a media player.

A combination of proximity sensors of different types may also be used to identify people proximate to a display device. For instance, both RFID-based and NFC-based proximity sensors may be used to identify people.

In an implementation, people identified by a proximate sensor(s) as proximate to a display device may be grouped together as a set: ID={userID1, userID2, userID3, . . . }, where userID1, userID2, and userID3 represent identities of the three identified individuals.

At block 204, a user(s) attentive to the display device is identified amongst the people identified as proximate to the display at block 202. In other words, a determination is made to detect an individual(s) who is/are actively paying attention to the display from the group of individuals who are identified as people present in proximity of the display. A camera along with a face detection module (machine readable and executable instructions) may be used to detect a user(s) who is/are attentive towards the display. The camera may be operationally coupled to the display device, and may be a removable or non-removable module with respect to the display device. In an example, the face detection module is present within the camera. In another example, the face detection module may be present on a computing device coupled to the display.

Face detection module detects faces of individuals whose frontal faces are attentive to the display device and the location of such individuals relative to the display device. In other words, a frontal face is considered as a proxy for attention, and an individual(s) whose frontal face is attentive to the display device (facing the device) is considered as paying attention to the display. Individual(s) detected in such manner may be grouped together as a set: ATN=((FaceA, LocationA), (FaceB, LocationB), . . . ) where (FaceA, LocationA) and (FaceB, LocationB) represent face and location identities of two individuals (individuals "A" and "8"). The ATN set does not include faces of individuals who are inattentive. However, inattentive users may be present in the set "ID", mentioned earlier, due to their proximity to the sensor.

At block 206, identity of an attentive user is determined. In other words, a user(s) who is/are found to be paying attention to or actively engaged with the display device is/are identified. A face recognition module (machine readable and executable instructions) may be used to identify a user(s) who is/are detected as attentive towards the display. In an example, the face recognition module is present within the camera. In another example, the face recognition module may be present on a computing device coupled to the display.

Face recognition module determines the identity of the individual(s) who is/are attentive to the display device. Since inattentive users are excluded from the people who are originally identified as proximate to the display device, face recognition module is benefited from the advantage of analyzing a limited set of identities to identify the attentive user(s). In other words, face recognition module determines the identity of the set ATN using the limited dictionary of identities sensed in the proximity which is from set ID. This results in a modified ATN set i.e. REC={(userID1, LocationA), (userID3, LocationB), . . . } where (userID1, LocationA), (userID3, LocationB) represent identity and location of two individuals detected as paying attention to the display. The inattentive users do not appear in the REC set since they are not paying attention and were not in the ATN set. The face recognition module performs much better with the limited ID set than an open dictionary face recognition module which can be computationally intensive making it unreliable and impractical to use.

In an implementation, face recognition module determines the identity of the individual(s) who is/are attentive to the display device from a pre-existing set of user profiles or identities stored in a database which may be present on a computing device coupled to the display. To provide an illustration, let's consider a scenario where a display is located or planned to be placed at an airport. In this case a pre-defined set of user identities can be created by encouraging fliers or users to provide a photo at the time of booking a ticket. In another illustration, user profiles in a passport database can be used to identify user attentive to a display.

To provide a yet another illustration, user profiles in an online social media network or database may be used to identify an attentive user(s).

At block 208, upon identification of an attentive user, personalized content is presented on the display device. In other words once an attentive user is identified, the content on the display is adapted based on the identity of the user. To provide an illustration, let's consider an earlier described scenario where a display is located at an airport. In this case, once the identity of an attentive user or flier is identified, information such as flight timings, flight transfer information, airport directions, etc. which could be relevant to the attentive user may be presented on the display. To provide another illustration, let's consider a scenario where a display is located at a retail store. In this case, once the identity of an attentive user is identified, information such as new product details, promotional schemes, discount coupons, etc. which could be useful to the attentive user may be presented on the display.

In an implementation, if a plurality of users is identified as attentive to a display device, the display area (screen) may be divided into different parts or sections for displaying personalized information for each identified user.

The above described examples of the proposed solution provide a better user experience as attentive users are provided personalized information based on a robust face recognition using a smaller dictionary of users identified from proximity sensors. In an implementation, the proposed solution could be offered as a premium service to a specific class of passengers, frequent fliers, etc. Such groups of people can be provided an option of enrolling for this service which may require a passenger to provide his/her photo to the service provider at the time of enrollment.

For the sake of clarity, the term "module", as used in this document, may mean to include a software component, a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computer system.

It would be appreciated that the system components depicted in the illustrated figures are for the purpose of illustration only and the actual components may vary depending on the computing system and architecture deployed for implementation of the present solution. The various components described above may be hosted on a single computing system or multiple computer systems, including servers, connected together through suitable means.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

The invention claimed is:

1. A method of detecting an attentive user for providing personalized content on a display, comprising:
   identifying people proximate to the display;
   detecting a user attentive to the display amongst the people proximate to the display;
   determining identity of only the attentive user amongst the people proximate to the display, wherein identity of the other people proximate to the display are not identified; and
   displaying personalized content on the display based on the identity of the attentive user.

2. The method of claim 1, wherein identifying the people proximate to the display comprises identifying a Near Field Communication (NFC) enabled device carried by the people.

3. The method of claim 2, wherein the Near Field Communication (NFC) enabled device is one of a mobile phone, a personal computer, a tablet and a personal digital assistance device.

4. The method of claim 1, wherein identifying the people proximate to the display comprises identifying a Radio-frequency Identification (RFID) enabled device carried by the people.

5. The method of claim 1, wherein identifying the user attentive to the display comprises detecting a user facing the display amongst the people proximate to the display, wherein faces of the other people proximate to the display are not detected.

6. The method of claim 1, wherein determining the identity of the attentive user comprises searching user profiles of the people identified as proximate to the display.

7. A system for detecting an attentive user to provide personalized content on a display, comprising:
   a proximity sensor to identify people proximate to the display;
   a camera to detect a user attentive to the display amongst the people proximate to the display;
   a face recognition module to determine identity of only the attentive user amongst the people proximate to the display, wherein identity of the other people proximate to the display are not identified; and
   a display device to display personalized content on the display based on the identity of the attentive user.

8. The system of claim 7, wherein the proximity sensor is a Near Field Communication (NFC) or Radio-frequency Identification (RFID) enabled device.

9. The system of claim 7, wherein the face recognition module identifies the attentive user amongst user profiles of the people identified as proximate to the display.

10. The system of claim 9, wherein the user profiles of the people identified as proximate to the display are stored in a database.

11. The system of claim 10, wherein the database is a repository comprising passport profiles of individuals.

12. The system of claim 10, wherein the database is a repository of an online social network.

13. The system of claim 7, wherein the display is located at a public place.

14. The system of claim 7, wherein the display is located at a private place.

15. The system of claim 7, wherein the proximity sensor recognizes personal devices of individuals to identify people proximate to the display.

* * * * *